United States Patent
Bhagwani et al.

(10) Patent No.: US 11,310,854 B2
(45) Date of Patent: Apr. 19, 2022

(54) INDUSTRIAL WIRELESS NETWORK INFRASTRUCTURE SUPPORTING MULTIPLE SUBNETS

(71) Applicant: Honeywell International Inc., Morris Plains, NJ (US)

(72) Inventors: Maneesh Bhagwani, Rajasthan (IN); Prasad Samudrala, Karnataka (IN); Vibhor Tandon, Dubai (AE)

(73) Assignee: Honeywell International Inc., Charlotte, NC (US)

( * ) Notice: Subject to any disclaimer, the term of this patent is extended or adjusted under 35 U.S.C. 154(b) by 66 days.

(21) Appl. No.: 16/653,290

(22) Filed: Oct. 15, 2019

(65) Prior Publication Data
US 2020/0128600 A1 Apr. 23, 2020

Related U.S. Application Data

(60) Provisional application No. 62/749,235, filed on Oct. 23, 2018.

(51) Int. Cl.
*H04W 76/15* (2018.01)
*H04W 24/08* (2009.01)
*H04W 88/08* (2009.01)

(52) U.S. Cl.
CPC ........... *H04W 76/15* (2018.02); *H04W 24/08* (2013.01); *H04W 88/08* (2013.01)

(58) Field of Classification Search
CPC ..... H04W 24/08; H04W 28/24; H04W 48/18; H04W 4/70; H04W 76/15; H04W 88/08
See application file for complete search history.

(56) References Cited

U.S. PATENT DOCUMENTS

| | | | |
|---|---|---|---|
| 2007/0195729 A1* | 8/2007 | Li | H04L 61/2092 370/328 |
| 2013/0021167 A1* | 1/2013 | Harper, Jr. | G05B 9/02 340/870.01 |
| 2015/0096008 A1* | 4/2015 | Short | H04L 63/0227 726/13 |
| 2016/0105821 A1* | 4/2016 | Senarath | H04W 76/00 370/329 |

* cited by examiner

*Primary Examiner* — Minh Trang T Nguyen
(74) *Attorney, Agent, or Firm* — Paschall & Associates, LLC; James C. Paschall

(57) ABSTRACT

This disclosure provides an industrial wireless network infrastructure supporting multiple subnetworks (subnets). An apparatus, system and method is provided that includes an access point comprising one or more wireless radios configured to communicate with one or more wireless devices; and one or more processors configured to enforce quality of service (QoS) based on multiple applications associated with the one or more wireless devices; wherein the access point is configured to use multiple subnetwork identifiers to communicate with the one or more wireless devices.

20 Claims, 5 Drawing Sheets

INDUSTRIAL WIRELESS NETWORK INFRASTRUCTURE SUPPORTING MULTIPLE SUBNETS

CROSS-REFERENCE

This application claims priority to provisional application 62/749,235, filed on Oct. 23, 2018 which is incorporated herein in its entirety.

TECHNICAL FIELD

This disclosure relates generally to industrial process control and automation systems. More specifically, this disclosure relates to an industrial wireless network infrastructure supporting multiple subnetworks (subnets).

BACKGROUND

Industrial process control and automation systems are often used to automate large and complex industrial processes. These types of systems routinely include various components including sensors, actuators, and process controllers. Some of the process controllers can receive measurements from the sensors and generate control signals for the actuators.

While originally viewed negatively due to actual or perceived concerns over reliability, it has become common for wireless devices to be used for data acquisition and monitoring functions in control and automation systems. Data acquisition functions generally relate to capturing data associated with one or more industrial processes and relaying that data to one or more destinations. Monitoring functions generally relate to monitoring the operation of one or more industrial processes in order to identify abnormal or other conditions associated with the industrial processes.

Multiple subnetworks (subnets) within an infrastructure having multiple access points (such as multiple FIELD DEVICE ACCESS POINTS or "FDAPs") can be difficult to deploy and maintain, and the associated costs of deployment and maintenance are higher due to the use of an infrastructure with only one subnet identifier (ID). When there is a single subnet/network ID for a deployment of wireless devices, it is often difficult to identify which groups of wireless devices are associated with different applications, areas, data publication rates, etc.

Requiring multiple access points that use different subnet/network IDs typically results in each access point being underutilized. Enabling wireless devices that use different subnet/network IDs under a single access point helps to utilize the capacity of the access point to a greater extent, which reduces the number of access points used and simplifies installation and maintenance. Separating application-based wireless devices under a different subnet per application makes maintenance easier, and Quality of Service (QoS) can be assigned to each application rather than to each wireless device. ISA100.11a/IEC62734 defines QoS for different messages and applications. The applications can be classified and treated differently. Level differentiations can be used to prioritize data communications at L2 and L3 levels.

An example network is a HONEYWELL ONEWIRELESS network or another wireless network, different types of wireless devices can be installed at a plant or other location based on the devices' applications. Across a given area, the wireless devices are connected to access points using wireless connections. Specific examples of wireless devices can include gas sensing devices or other safety sensors, pressure controlled loops (such as for control valves, tank levels, different pressure flows, etc.), tank level measurements (such as for custody transfers and storage of crude oil), process measurement devices (such as for input values like pressure or temperature or output values like digital outputs) and asset health monitoring devices or sensors (such as vibration monitoring of equipment).

SUMMARY

This disclosure provides an industrial wireless network infrastructure supporting multiple subnetworks (subnets). In one embodiment, the disclosure relates to an apparatus comprising an access point comprising one or more wireless radios configured to communicate with one or more wireless devices; and one or more processors configured to enforce quality of service (QoS) based on multiple applications associated with the one or more wireless devices. The access point can be configured to use multiple subnetwork identifiers to communicate with the one or more wireless devices. The access point may be further configured to communicate with at least one device manager that defines the QoS for the applications. The access point may be configured to communicate with multiple device managers each associated with a different subnetwork identifier. The access point may be configured to communicate with a single device manager associated with the multiple subnetwork identifiers.

In another embodiment, the disclosure provides a system comprising an access point comprising one or more wireless radios configured to communicate with one or more wireless devices; and one or more processors configured to enforce quality of service (QoS) based on multiple applications associated with the one or more wireless devices; wherein the access point is configured to use multiple subnetwork identifiers to communicate with the one or more wireless devices and at least one device manager configured to define the QoS for the applications. The system may comprise multiple device managers each associated with a different subnetwork identifier or a single device manager associated with multiple subnetwork identifiers.

In another embodiment, the invention comprises a method comprising communicating with one or more wireless devices using one or more wireless radios of an access point; enforcing quality of service (QoS) based on multiple applications associated with the one or more wireless devices using one or more processors of the access point; and using, by the access point, multiple subnetwork identifiers to communicate with the one or more wireless devices.

In yet another embodiment, the invention comprises a method comprising commissioning a wireless network associated with an industrial process control and automation system; and assigning multiple subnetwork identifiers to the wireless network during the commissioning; wherein the multiple subnetwork identifiers are selected based on at least one of application needs within the industrial process control and automation system; types of devices used in the industrial process control and automation system; areas or zones associated with the industrial process control and automation system; roles or privileges for users associated with the industrial process control and automation system; and wireless communication protocols used in the wireless network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

One example of a general process industry application classification is shown below, where non-critical surveillance and critical surveillance are major candidates for the use of wireless devices. Some critical applications are also using wireless devices with slower process. In some embodiments, non-critical surveillance can be integrated to Level-3 (a.k.a. IT/OT WSN), and critical surveillance applications can be integrated into Level-2 (a.k.a. OT WSN).

If given the flexibility to create different network IDs (such as one for PCS non-critical surveillance, one for SIS non-critical surveillance, one for equipment monitoring non-critical surveillance, etc.) on the same wireless network infrastructure, this would make deployment and support much easier and much more efficient and cost effective.

This example of such a system has three main sections, a process control system, a safety integrated system and equipment. The process control system will include critical process control applications, non-critical process control applications, critical process surveillance applications and non-critical surveillance process applications. The safety integrated system may include critical safety shutdown applications, critical safety surveillance such as gas detectors, SDV feedback for real-time operation decisions and non-critical safety surveillance such as SDV feedback used for post event engineering analysis.

As a simplified example, assume there is some number of sensors (such as 200 sensors of various types) installed in three process areas. Each process area might have two access points to provide wireless coverage. At the back end, one device manager may be needed to manage all access points. If multiple network IDs are used, network ID 111 can be assigned for area 1, network ID 222 can be assigned for area 2, and network ID 333 can be assigned for area 3. This makes the overall system much easier to configure and manage.

A few advantages of this approach can include, depending on the implementation: ISA100.11a/IEC62734 defines QoS for different messages and applications. Although QoS is not available on all products, it would be beneficial if there is a way that applications can be classified and treated differently (similar to network-based QoS). The described approach allows different applications to be classified and treated differently.

With only one network ID, the deployment of a wireless sensor network or other wireless network is typically completely flat. This makes it very difficult to identify groups of devices for different applications, areas, publication rates, etc. The described approach allows various standard or custom topologies to be used. The described approach allows for the ability to make changes to a specific group of devices without impacting the whole wireless network. Manageability is much better with multiple small groups of wireless devices, rather than a single large group.

Figure 1:
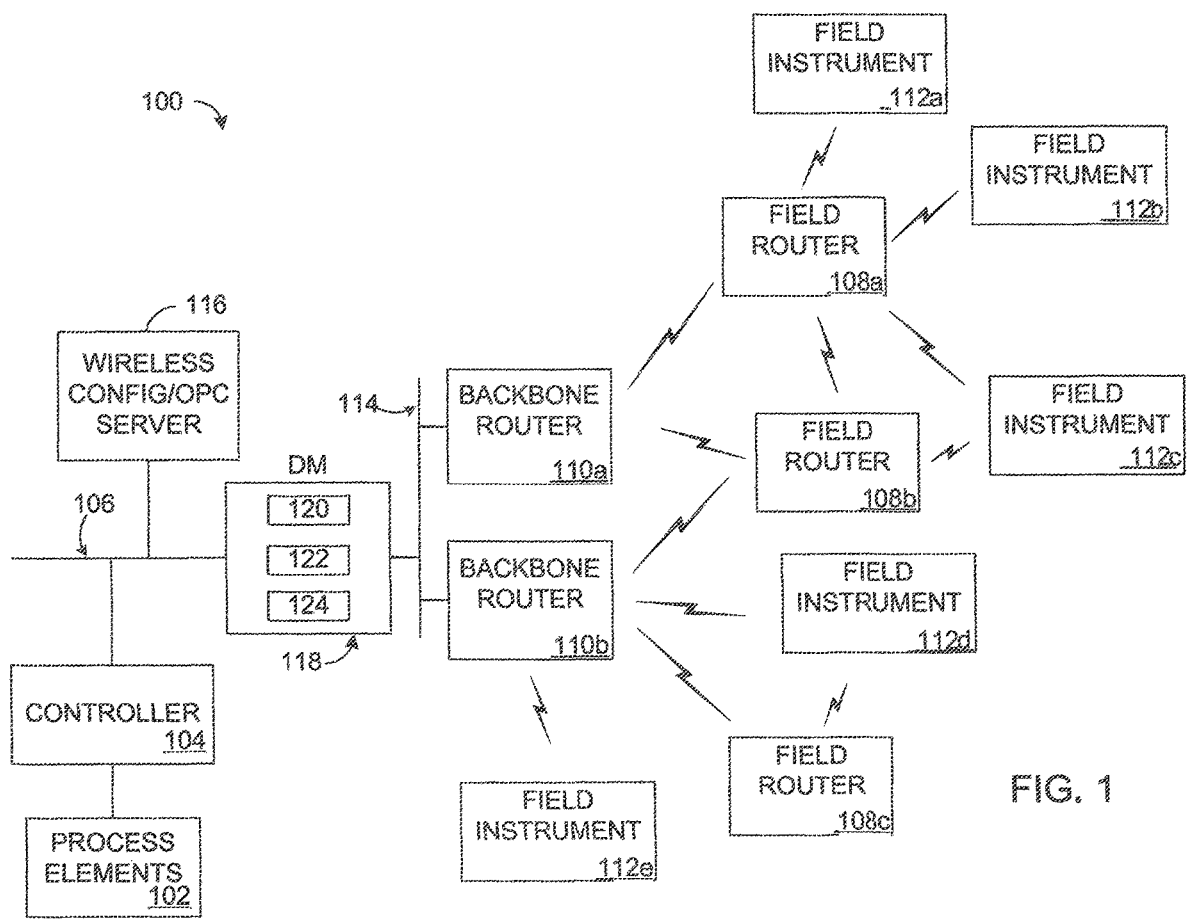
FIG. 1 illustrates an example industrial control and automation system according to this disclosure.
Figure 2:
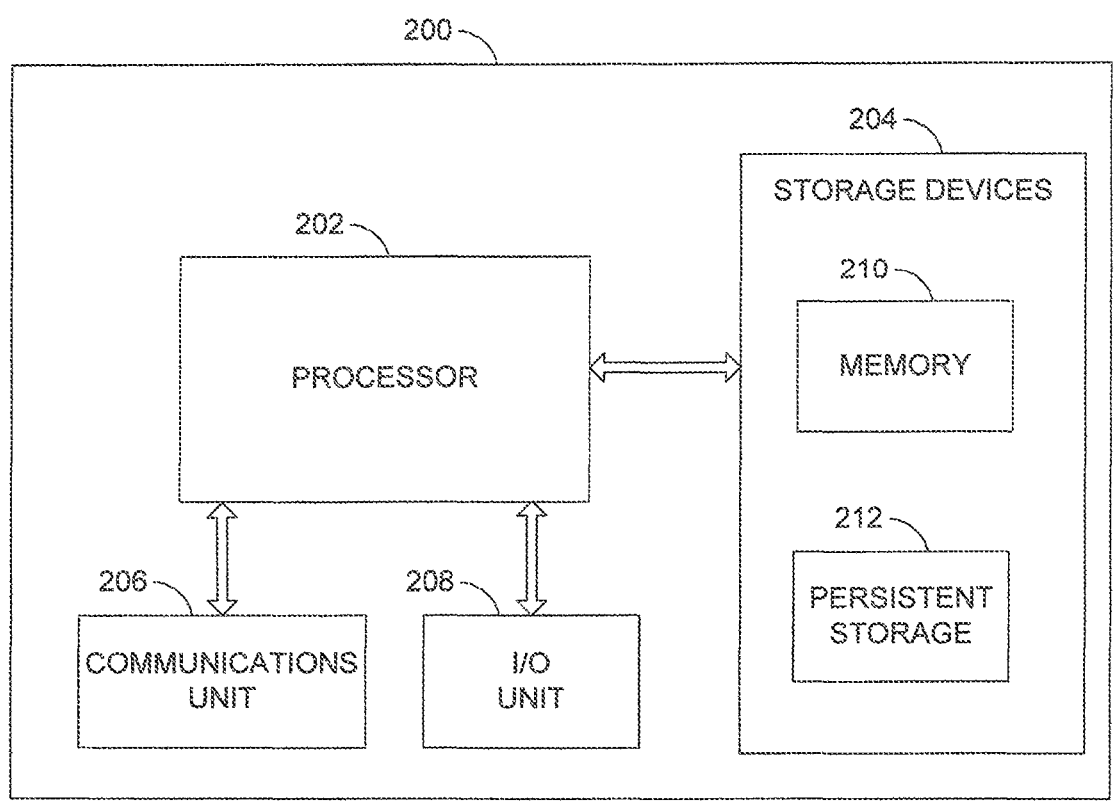
FIG. 2 illustrates an example device supporting the use of multiple subnetworks (subnets) in an industrial wireless network infrastructure according to this disclosure.

FIGS. 1 and 2, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, it has become common for wireless devices to be used for data acquisition and monitoring functions in industrial process control and automation systems. However, wireless devices can be used for various applications within control and automation systems, and different applications can be associated with different data priorities. For example, certain equipment may need to be monitored more closely than other equipment, such as when equipment that can explode or cause widespread damage is monitored more closely than equipment that cannot. In these situations, higher-priority data needs to be transmitted ahead of lower-priority data.

In many control and automation systems, a wireless network has a single subnet or network ID, and all wireless devices use the same subnet or network ID. This can cause various problems, which are described below in more detail in the Appendix. This disclosure provides various approaches for implementing a "sharable" wireless network infrastructure in which multiple wireless networks defined using different subnet or network IDs are available for use. For example, in one approach, a single device manager can be used with one or more access points, where the device manager and the access points can support different subnet or network IDs. In another approach, multiple device managers each supporting one subnet or network ID can be used with one or more access points, where the access points can support different subnet or network IDs. These approaches enable various functions to be implemented within the wireless network infrastructure, such as quality of service (QoS) enforcement based on QoS allocated to applications associated with wireless devices rather than QoS allocated to the wireless devices. Among other things, this can greatly simplify installation and maintenance of the wireless network infrastructure and reduce the installation and maintenance costs of the wireless network infrastructure.

FIG. 1 illustrates an example industrial control and automation system 100 according to this disclosure. As shown in FIG. 1, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system represents any system or portion thereof configured to process one or more materials in some manner.

At least one controller 104 is coupled to the process elements 102. The controller 104 controls the operation of one or more of the process elements 102. For example, the controller 104 could receive information associated with the process system, such as sensor measurements from some of the process elements 102. The controller 104 could use this information to generate control signals for others of the process elements 102 such as actuators, thereby adjusting the operation of those process elements 102. Each controller 104 includes any suitable structure for controlling one or more process elements 102. Each controller 104 could, for example, represent a computing device executing a MICROSOFT WINDOWS or suitable real-time operating system.

At least one network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks, all or a portion of a global network, or any other communication system(s) at one or more locations. As a particular example, the network 106 could include a FAULT TOLERANT ETHERNET network from HONEYWELL INTERNATIONAL INC.

The system 100 also includes one or more industrial wireless networks for communicating with wireless sensors or other wireless field devices. In the example shown in FIG. 1, an industrial wireless network includes field routers 108a-108c and backbone routers 110a-110b. The field routers 108a-108c and backbone routers 110a-110b wirelessly communicate with each other to form a wireless network, such as a mesh network. For example, the field routers 108a-108c could receive data transmitted wirelessly from field instruments 112a-112e and route the data to the backbone routers 110a-110b. The backbone routers 110a-110b could receive data from the field routers 108a-108c directly or indirectly (such as through other field routers) and directly or indirectly from the field instruments 112a-112e for transmission over a backbone network 114. The field routers 108a-108c and backbone routers 110a-110b could also route data received over the backbone network 114 to the field instruments 112a-112e. In this way, the field routers 108a-108c and backbone routers 110a-110b form a network that can provide wireless coverage to field instruments and other devices in a specified area, such as a large industrial complex. The wireless network can support any suitable industrial wireless network protocol(s), such as ISA100 Wireless or WirelessHART.

In this example, the field routers 108a-108c and backbone routers 110a-110b generally represent routing devices that store and forward messages for other devices. Field routers 108a-108c may be battery-powered or otherwise locally powered, and backbone routers 110a-110b may be line-powered or receive operating power from external sources (such as AC supply lines). However, each field or backbone router could be powered in any suitable manner. The field instruments 112a-112e generally represent non-routing devices that are routinely locally-powered, although a field instrument could provide routing functionality or be line-powered.

Each field router 108a-108c and backbone router 110a-110b includes any suitable structure facilitating wireless communications, such as a radio frequency (RF) frequency-hopping spread spectrum (FHSS) or direct sequence spread spectrum (DSSS) transceiver. Each of the backbone routers 110a-110b also includes any suitable structure facilitating communication over the backbone network 114, such as an Ethernet transceiver. In particular embodiments, the field routers 108a-108c could represent field device access points (FDAPs) that are not connected via wired connections and may be locally powered, and the backbone routers 110a-110b could represent FDAPs that are connected via wired Ethernet or other wired connections and may be line powered. The backbone network 114 includes any suitable network for transporting data, such as a FAULT TOLERANT ETHERNET network, a wireless mesh network, or other wired or wireless network.

A wireless configuration and OLE for Process Control (OPC) server 116 can configure and control various aspects of the system 100 via one or more device managers (DMs) 118. For example, the server 116 allows for the control of process elements 102 or other devices via the controller 104 and via the device manager 118, such as to configure the operation of the field routers 108a-108c, backbone routers 110a-110b, and field instruments 112a-112e. The server 116 could also support security in the system 100, such as by allowing for the device manager 118 to distribute cryptographic keys or other security data to various wireless devices or other components. The server 116 includes any suitable structure for operating industrial control and automation system 100.

The device manager 118 supports various functional components used to manage and interact with at least one wireless network. For example, the device manager 118 can include a gateway 120, a security manager 122, and a system manager 124. The gateway 120 performs various translation functions, allowing information to be exchanged between networks using different protocols. For instance, the gateway 120 could translate between one or more wired Ethernet protocols and one or more wireless protocols. The security manager 122 performs various security-related functions, such as functions to allow only authorized traffic to flow between the networks 106, 114. The system manager 124 performs various management functions to manage at least one wireless network. For example, the system manager 124 could collect quality statistics and calculate overall qualities of communication paths in a wireless network. The system manager 124 can also be responsible for choosing communication paths for each device and managing any resources needed to communicate over the wireless network (such as by allocating communication slots and coordinating slot allocations between different devices).

Each functional component 120-124 in the device manager 118 could be implemented in any suitable manner. For example, each functional component 120-124 could be implemented using hardware or a combination of hardware and software/firmware instructions. Also, hardware can be shared between the functional components 120-124, such as when the same processing devices are used to execute instructions of the functional components 120-124. While shown as forming part of a single device manager 118, one or more functional components 120-124 could be implemented as separate components.

In particular embodiments, various devices in the wireless network of FIG. 1 form a mesh network communicating at 2.4 GHz or 5.8 GHz. Also, in particular embodiments, data can be injected into the wireless mesh network through the routers or field instruments, thus providing versatile, multi-functional, plant-wide coverage for wireless sensing, asset location tracking, personnel tracking, wireless communications, and any other or additional functionality as desired.

As described in more detail below, the one or more device managers 118 and the field routers 108a-108c/backbone routers 110a-110b (referred to generally as "access points") can be designed and operated to support the use of multiple subnet/network IDs. Thus, multiple networks can be formed using the same wireless network infrastructure in the system 100.

Although FIG. 1 illustrates one example of an industrial control and automation system 100, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while the wireless network is illustrated as being used along with a wired controller 104 and wired process elements 102, one or more wireless networks could be used in a system without wired control elements. In addition, FIG. 1 illustrates one example operational environment where an industrial wireless network infrastructure supporting multiple subnets can be used. This functionality could be used in any other suitable system, and that system need not relate to industrial process control and automation. As a particular example, in FIG. 1, the field instrument 112b can belong to one wireless subnet, and the field instrument 112c can belong to a different wireless subnet. The backbone routers 110a-110b and the field routers 108a-108c could therefore support multiple subnet IDs to communicate with devices using the different wireless subnets, and the device manager 118 can support one or more subnet IDs. It is also possible to install and use multiple device managers 118 here, where each device manager 118 supports one more subnet IDs in FIG. 1.

FIG. 2 illustrates an example device 200 supporting the use of multiple subnetworks (subnets) in an industrial wireless network infrastructure according to this disclosure. For ease of explanation, the device 200 is described as being used in the industrial control and automation system 100 of FIG. 1. The device 200 could, for example, represent at least part of a field router 108a-108c, backbone router 110a-110b, or device manager 118. However, the device 200 could be used in any other suitable system, and the field routers 108a-108c, backbone routers 110a-110b, and device managers 118 can be implemented in any other suitable manner.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry. The processor 202 could execute any suitable instructions, such as those implementing or supporting wireless communication functionality, routing functionality, gateway functionality, or device management functionality. In particular, the processor 202 could execute suitable instructions that support the use of multiple subnets in a wireless network infrastructure.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

Each communications unit 206 represents an interface supporting communications with other systems or devices. For example, in some devices, at least one communications unit 206 could include one or more wireless radios for communicating wirelessly, such as with one or more field routers 108a-108c, backbone routers 110a-110b, or field instruments 112a-112e. As another example, in some devices, at least one communications unit 206 could include one or more wired transceivers for communicating with wired devices, such as one or more backbone routers 110a-110b or device managers 118. The device 200 could support wired communications, wireless communications, or both depending on the implementation. Each communications unit 206 may support communications through any suitable physical or wireless communication link(s).

Each I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the use of the I/O unit 208 for local I/O may not be needed, such as when the device 200 is accessible locally or remotely over a network connection.

Although FIG. 2 illustrates one example of a device 200 supporting the use of multiple subnets in an industrial wireless network infrastructure, various changes may be made to FIG. 2. For example, various components in FIG. 2 could be combined, further subdivided, or omitted and additional components could be added according to particular needs. Also, computing and communication devices can come in a wide variety of configurations, and FIG. 2 does not limit this disclosure to any particular configuration of computing or communication device.

Figure 3:
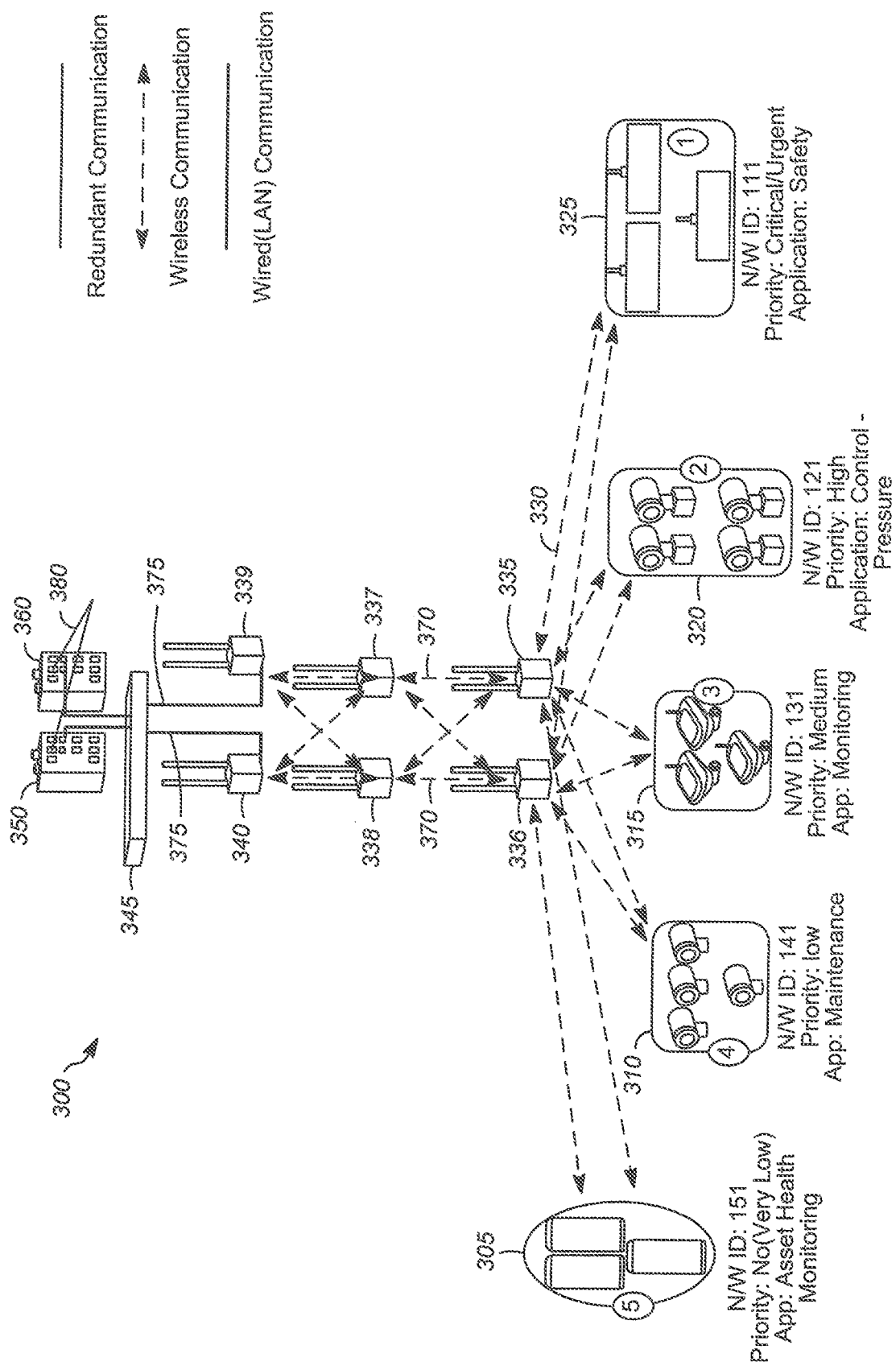
FIG. 3 illustrates an example of a single wireless device manager with multiple subnets.

FIG. 3 shows a single redundant wireless device manager or other device manager with multiple subnet identification. Device-level or asset-level or application level prioritization can be used for wireless devices within a single wireless infrastructure and the single wireless infrastructure can support multiple subnet IdS. In an example of this approach, the system 300 is shown with a group of devices or functions that include equipment 325 to monitor safety with a critical/urgent priority. Equipment 320 monitors pressure and is rated as a high priority. Equipment 315 monitors the plant process and is considered to be a medium priority. The equipment 310 measures the need for maintenance and is a relatively low priority. Equipment 305 is a very low priority and monitors the health of the plant equipment. Equipment 305, 310, 315, 320 and 325 include sensors and have the ability to transmit data in a wireless manner as illustrated by the dashed arrow lines between them and routers 335 and 336. In each case the data may be sent to either router 335 or router 336. The wireless communications may then as shown by line 370 be sent to either router 357 or router 358 as well as to router 340 and router 339. In FIG. 3, the solid lines that go from routers 339 and 340 to device managers 350 and 360 are wired, ethernet cables. 345 is a standard Ethernet switch. In this approach, different QoS can be allocated to each application based on its criticality. Instead of allocating QoS to each device, QoS can be allocated to each subnet. The routers 335, 336, 337 and 338 routes the packets received wirelessly from different field devices using the priority-based Network Id in the wireless system 300.

In some embodiments, an FDAP (Field Device Access Point) or other access point can be provisioned with one or multiple subnet IDs when joined to a WDM or other device manager. Each access point can perform traffic prioritization based on the highest QoS so that critical application traffic is sent first. In some embodiments, a device manager's user interface has a way to configure multiple subnet IDs in each device manager (such as during its first-time configuration or later through its user interface).

Figure 4:
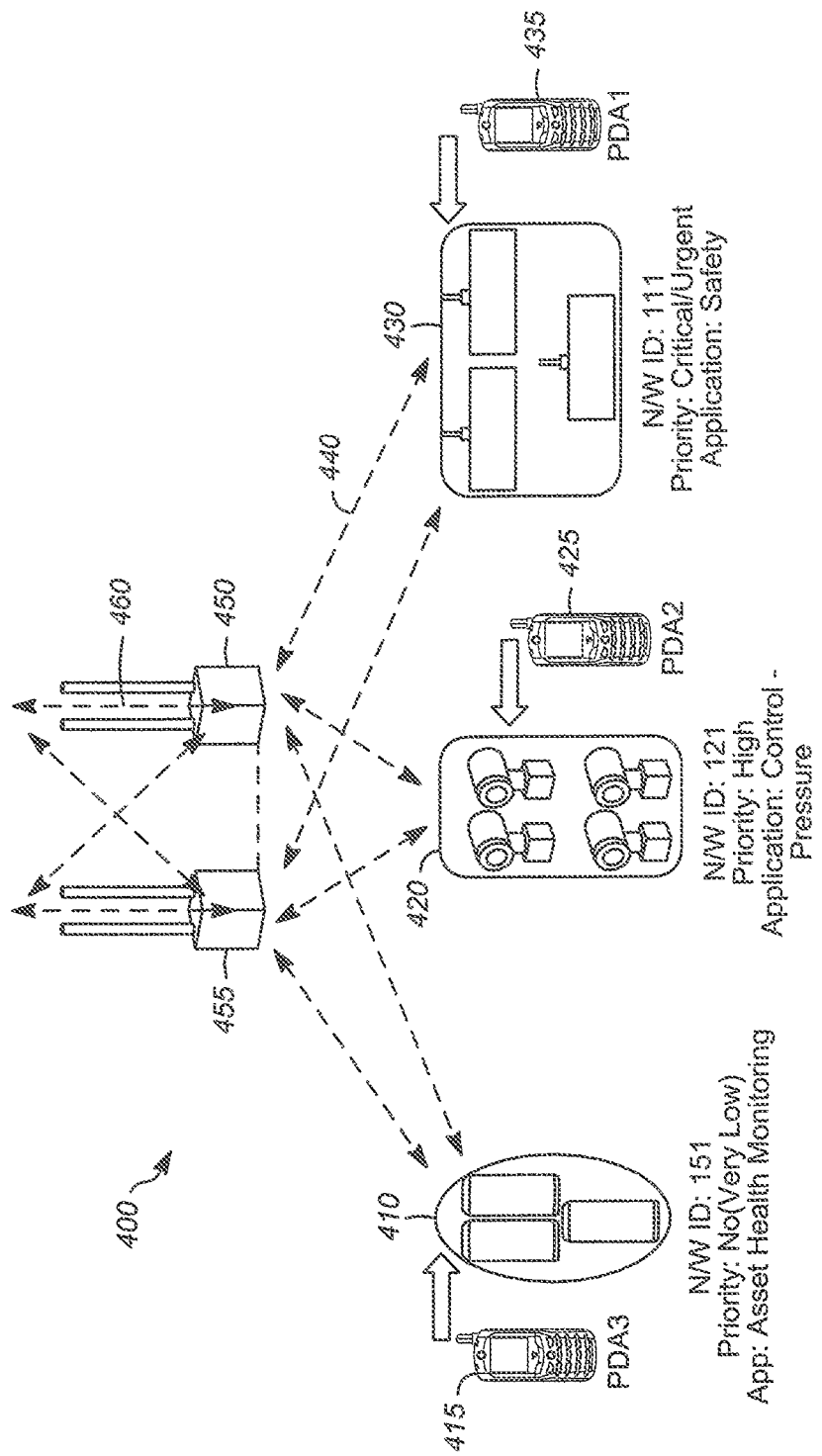
FIG. 4 illustrates an example of wireless devices used in multiple application, provisioning them with multiple provisioning devices each supporting different network ids.

In some embodiments, a provisioning device (used to configure other devices so the other devices can communicate over a wireless network) can be given only one set of keys belonging to one subnet ID. This helps to make sure that an installer is only provisioning wireless devices for a specific subnet. An example is shown in FIG. 4 which shows a system 400 three such provisioning wireless devices 415, 425 and 435 communicating respectively to devices 410 that monitor asset health, devices 420 that control pressure and devices 430 that monitor critical safety applications. Communications regarding the information gathered from each such device is sent to routers 450 and 455 as shown by hyphened lines 440 and then such information is relayed through lines 450.

The representation of multiple subnet devices in a device manager's user interface can be managed based on their applications.

Figure 5:
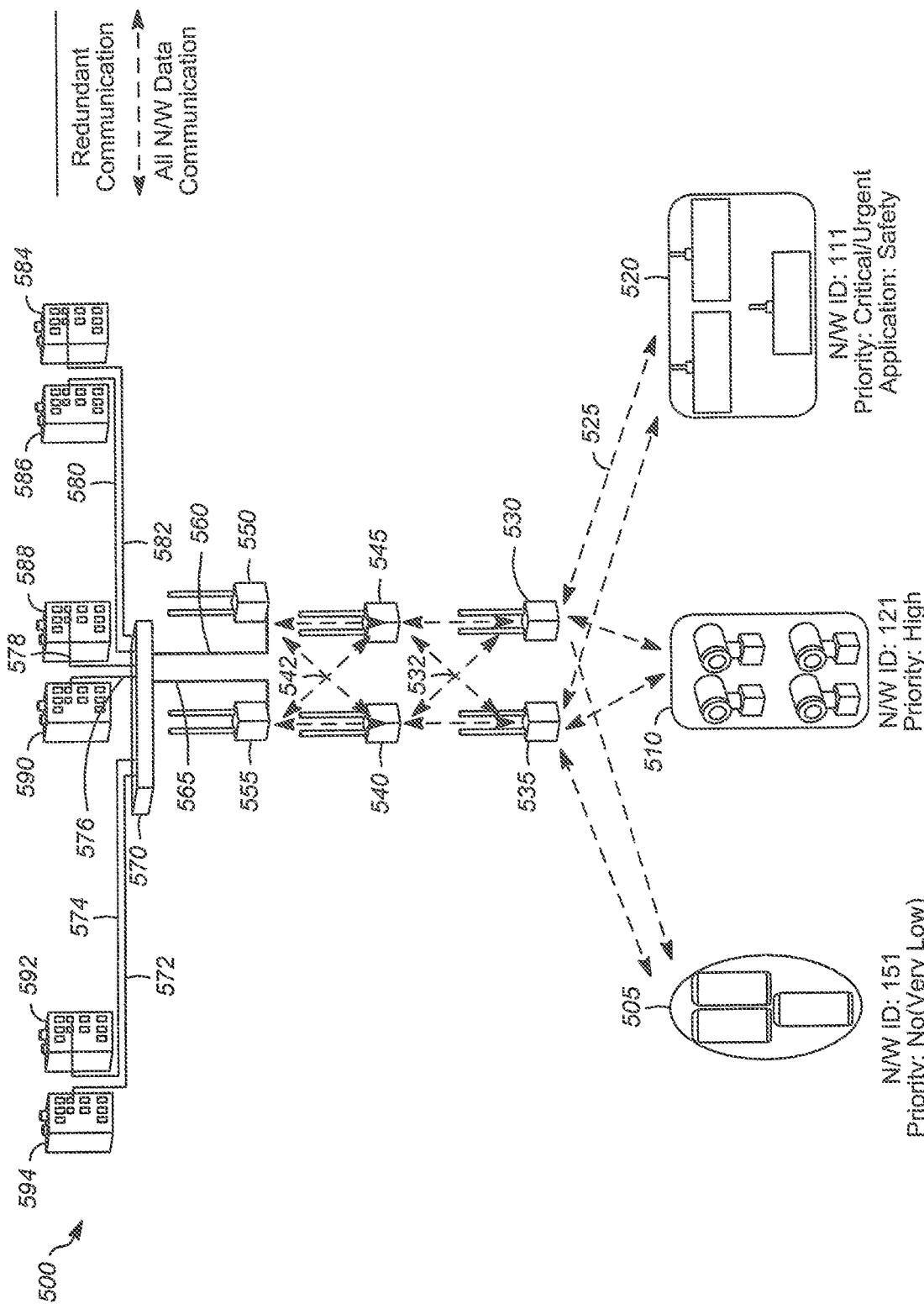
FIG. 5 illustrates an example with multiple wireless device managers each with a single subnet ID.

In the approach shown in FIG. 5, there are multiple wireless device managers or other device managers shown each with a single subnet ID. In system 500, there are shown three different sets of monitoring devices 505, 510 and 520. In this approach, device 505 measures asset health, device 510 measures and controls pressure and device 520 monitors critical safety parameters. Each of these devices communicates as shown by lines 525 that signify wireless communication. Then there are shown a series of routers 530, 535, 540, 545, 550, 555 with communications being sent through broken lines 532 and 542 that may be sent to either of the next available routers. Routers 550 and 555 are shown communicating through a cable, such as an ethernet cable through an Ethernet switch 570 and then to a series of wireless device managers 586, 588, 590, 592, and 594 that are connected with an adjacent wireless device manager to provide redundancy in the system.

In this topology, different WDMs or other device managers can be used for different applications, rather than a single device manager (such as due to security, safety, usability or other concerns). The approach here is similar to the first approach above, but multiple single-infrastructure WDMs or other device managers are used in this topology.

In some embodiments, one of the device managers can be used to manage the time slots and frequency hopping operations used by all of the device managers. This helps to ensure that all access points' time slots and frequency hopping channels are unique (since a single access point can only manage one time slot per one device and this knowledge typically cannot be distributed between multiple access points). In some embodiments, the device manager's user interface can include a mechanism to specify which device manager manages the time slots. Each application devices needs to be assigned a unique Network Id during the provisioning process as shown in FIGS. 3, 4 and 5. One of the wireless device managers user interface shall be used to define the network ids of these applications. The assignment of network Id's for each Sub Network is illustrated in below table. These Network id's shall be propagated to the routers and access points during provisioning using the Provisioning Device when the routers are provisioned.

| Network ID-A | 111 |
| Network ID-B | 121 |
| Network ID-C | 131 |

Each access point also needs to know the network address (such as the IP address) for each device manager that the access point communicates with, and these network addresses can be loaded into the access point by any one of the device managers once joined with the access point.

| Network Details | Subnet | WDM IP Address |
| --- | --- | --- |
| Network ID-A | 111 | 192.168.1.11 |
| Network ID-B | 121 | 192.168.1.12 |
| Network ID-C | '151 | 192.168.1.13 |

As a particular example of this functionality, assume ONEWIRELESS devices or other wireless devices join a network under a line-power field router. These wireless devices can be selected based on their application and priority, and the priorities can be decided during installation based on plant requirements or at any other suitable times and in any other suitable ways.

Note that the details described herein relate to specific implementations and that other embodiments could differ from these implementations without departing from the scope of this disclosure. For example, specific protocols, vendors/manufacturers, devices, and applications may be described below, although these are for illustration only and do not limit the scope of this disclosure to the specific protocols, vendors/manufacturers, devices, and applications described.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   an access point comprising:
   one or more wireless radios configured to communicate with one or more groups of wireless devices; and
   one or more processors configured to enforce quality of service (QoS) based on multiple applications associated with the one or more groups of wireless devices and allocate the QoS to each subnetwork identifier of multiple subnetwork identifiers based on the multiple applications;
   wherein the access point is configured to use the multiple subnetwork identifiers to communicate with at least one group of the one or more groups of wireless devices.

2. The apparatus of claim 1, wherein the access point is further configured to communicate with at least one device manager that defines the QoS for the applications.

3. The apparatus of claim 2, wherein the access point is configured to communicate with multiple device managers each associated with a different subnetwork identifier.

4. The apparatus of claim 2, wherein the access point is configured to communicate with a single device manager associated with the multiple subnetwork identifiers.

5. A system comprising:
   the apparatus of claim 1; and
   at least one device manager configured to define the QoS for the applications.

6. The system of claim 5, wherein the system comprises multiple device managers each associated with a different subnetwork identifier.

7. The system of claim 6, wherein the at least one device manager includes a user interface configured to provide the subnetwork identifier for the multiple device managers.

8. The system of claim 6, wherein each device manager of the multiple device managers includes:
   a gateway configured to perform translation functions to allow exchange of information between the one or more groups of wireless devices;
   a security manager configured to allow authorized traffic to flow between the one or more groups of wireless devices; and
   a system manager configured to:
   collect quality statistics of communication paths associated with the one or more groups of wireless devices,
   calculate overall quality of the communication paths associated with the one or more groups of wireless devices, and
   allocate communication slots and coordinate slot allocations for the one or more groups of wireless devices.

9. The system of claim 5, wherein the system comprises a single device manager associated with the multiple subnetwork identifiers.

10. The apparatus of claim 1, wherein each subnetwork identifier of the multiple subnetwork identifiers includes a level of priority of at least one of a device, an asset, or an application associated with the one or more groups of wireless devices.

11. The apparatus of claim 1, wherein the multiple applications associated with the one or more groups of wireless devices include an asset health monitoring application, a maintenance application, a monitoring application, a pressure control application, and a safety application.

12. The apparatus of claim 1, wherein the multiple subnetwork identifiers are selected based on at least one of:
   application needs within the industrial process control and automation system;
   types of devices used in the industrial process control and automation system;
   areas or zones associated with the industrial process control and automation system;
   roles or privileges for users associated with the industrial process control and automation system; and
   wireless communication protocols used in the wireless network.

13. A method comprising:
   communicating with one or more groups of wireless devices using one or more wireless radios of an access point;
   enforcing quality of service (QoS) based on multiple applications associated with the one or more groups of wireless devices using one or more processors of the access point;
   allocating the QoS to each subnetwork identifier of multiple subnetwork identifiers based on the multiple applications; and
   using, by the access point, the multiple subnetwork identifiers to communicate with at least one group of the one or more groups of wireless devices.

14. The method of claim 13, wherein the access point is configured to communicate with multiple device managers each associated with a different subnetwork identifier.

15. The method of claim 13, wherein the access point is configured to communicate with a single device manager associated with multiple subnetwork identifiers.

16. The method of claim 13, wherein the access point is further configured to communicate with at least one device manager that defines the QoS for the applications.

17. A method comprising:
commissioning a wireless network including an access point associated with an industrial process control and automation system; and
assigning multiple subnetwork identifiers to the wireless network associated with one or more groups of wireless devices during the commissioning,
wherein the multiple subnetwork identifiers are selected based on at least one of:
- application needs within the industrial process control and automation system;
- types of devices used in the industrial process control and automation system;
- areas or zones associated with the industrial process control and automation system;
- roles or privileges for users associated with the industrial process control and automation system; and
- wireless communication protocols used in the wireless network.

18. The method of claim 17, wherein the access point is configured to communicate with multiple device managers each associated with a different subnetwork identifier.

19. The method of claim 17, wherein the access point is configured to communicate with a single device manager associated with multiple subnetwork identifiers.

20. The method of claim 17, wherein the access point is further configured to communicate with at least one device manager that defines the QoS for the applications.

* * * * *